United States Patent [19]

Tanaka et al.

[11] Patent Number: 4,489,346
[45] Date of Patent: Dec. 18, 1984

[54] SEPARATING FILTER

[75] Inventors: Yutaka Tanaka, Yokohama; Toshinobu Isobe, Tokyo, both of Japan

[73] Assignee: Sony Corporation, Tokyo, Japan

[21] Appl. No.: 420,952

[22] Filed: Sep. 21, 1982

[30] Foreign Application Priority Data

Sep. 21, 1981 [JP] Japan ................. 56-149182

[51] Int. Cl.³ ............................. H04N 9/535
[52] U.S. Cl. ...................................... 358/31
[58] Field of Search ............................ 358/31

[56] References Cited

U.S. PATENT DOCUMENTS 4,343,017 8/1982 Wilkinson ....................... 358/31
4,402,006 8/1983 Karlock ........................... 358/31

Primary Examiner—Michael A. Masinick
Attorney, Agent, or Firm—Lewis H. Eslinger; Alvin Sinderbrand

[57] ABSTRACT

A separating filter includes a band pass filter supplied with a composite color video signal, having a resonance frequency of a chrominance sub-carrier frequency, a first circuit supplied with the output of the band pass filter for generating first and second signals having the same phase but different time relationship, and a second circuit for comparing levels of the first and second signals with a level of a reference signal and for producing the signal that has a level nearer the reference level.

15 Claims, 54 Drawing Figures

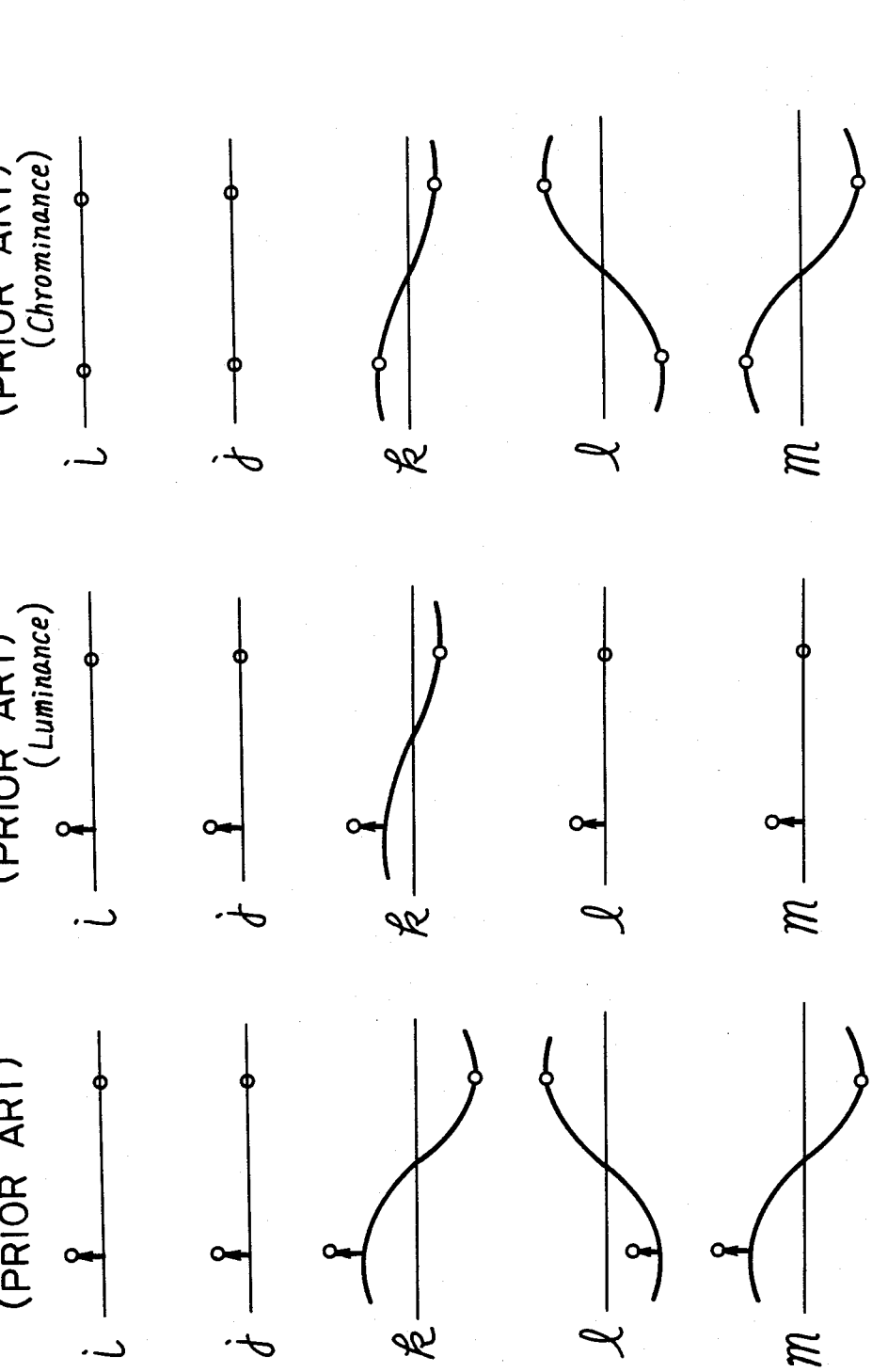

$f_{t-1} = f_t \not= f_{t+1}$ $f_{t-1} \not= f_t = f_{t+1}$ $f_{t-1} = f_{t+1} \not= f_t$ FIG. 11A
a 
b 
c 
FIG. 11B
$\bar{a}$ 
b 
$\bar{c}$ 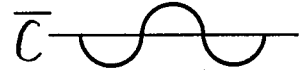
FIG. 11C
$\bar{a}'$ 
$b'$ 
$\bar{c}'$ 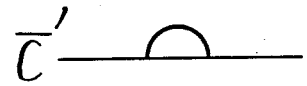
FIG. 11D
$\bar{a}''$ 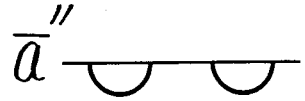
$b''$ 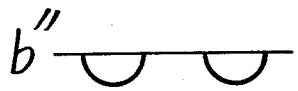
$\bar{c}''$ 
FIG. 11E
e 
FIG. 11F
f 
FIG. 11G  g 

FIG. 12G  $g$ ————

SEPARATING FILTER

BACKGROUND OF THE INVENTION

1. Field of the Invention

This invention relates generally to a separating filter for use with a color television receiver, which separates a luminance signal and a chrominance signal from a composite color video signal, and more particularly relates to a separating filter which can separate a luminance signal and a chrominance signal with no deterioration from a composite color video signal even in the absence of vertical correlativity of the composite color video signal.

2. Description of the Prior Art

To separate a luminance signal and a chrominance signal from a composite color video signal of, for example, NTSC (national television standard committee) system, there has been generally employed a band pass filter in the prior art. But, according to this separating method, all the luminance signals contained within the frequency band of, for example, 3.58 MHz±500 kHz are regarded as the chrominance signal so that the high frequency component of the luminance signal is mixed into the chrominance signal in the portion where the luminance signal changes abruptly resulting in a deterioration of a picture called as cross-color.

While, a so-called comb filter is known, which takes advantage of a vertical correlativity of a picture screen and also the fact that the phase of a subcarrier of the chrominance signal is inverted at every one horizontal period.

FIG. 1 schematically illustrates the circuit arrangement thereof, in which a signal from an input terminal 101 is supplied to an adding circuit 102 and a subtracting circuit 103, and also supplied to the adding circuit 102 and the subtracting circuit 103 by way of a one horizontal period (hereinafter, simply referred to 1H) delay circuit 104. Signals from the adding circuit 102 and the subtracting circuit 103 are supplied through attenuators 105 and 106, each of which attenuates the level of signal supplied thereto to ½, and then delivered to output terminals 107 and 108 respectively.

In the circuitry arranged so far, the adding circuit 102 cancels the chrominance signal and then produces the luminance signal at the output terminal 107, while the subtracting circuit 103 cancels the luminance signal and then produces the chrominance signal at the output terminal 108.

But, in this case, if such a signal in which as, for example, shown in FIG. 2A the level of a luminance signal is constant and a chrominance signal is added thereto from the halfway (third scanning line k and in FIG. 2, an arrow represents the level of the luminance signal and a curve represents the chrominance signal) is supplied to the afore-mentioned comb filter, the chrominance signal on the third scanning line k has no vertical correlativity so that the signal is deteriorated. In other words, although at the output terminal 107 is produced the luminance signal as shown in FIG. 2B, the chrominance signal is left on the third scanning line k and a so-called dot interference is caused thereby. Whereas, at the output terminal 108 is produced the chrominance signal as shown in FIG. 2C, but the level of the chrominance signal on the third scanning line k is decreased thus vertical resolution of the chrominance signal being deteriorated.

OBJECTS AND SUMMARY OF THE INVENTION

Accordingly, it is an object of this invention to provide a separating filter which can obviate the defects inherent in the prior art filter.

It is another object of this invention to provide a separating filter which is particularly suitable for use with a color television receiver.

It is still another object of this invention to provide a separating filter which can prevent a vertical resolution of a chrominance signal from being deteriorated.

It is further object of this invention to provide a separating filter which can extract a luminance signal free from a dot interference.

It is yet further object of this invention to provide a separating filter which can be applied to a case where the signal is processed in either way of analog and digital signals.

According to an aspect of the invention, there is provided a separating filter comprising:
(a) a band pass filter supplied with a composite color video signal, having a resonance frequency of a chrominance sub-carrier frequency;
(b) first means supplied with the output of said band pass filter, for generating first and second signals having the same phase but different time relationship; and
(c) second means for comparing levels of said first and second signals with a level of a reference signal and for producing the signal having a level nearer the reference level.

The other objects, features and advantages of the present invention will become apparent from the following description taken in conjunction with the accompanying drawings through which the like references designate the same elements and parts.

BRIEF DESCRIPTION OF THE DRAWINGS

FIGS. 2A to 2C are respectively waveform diagrams used to explain the operation of the same;

FIG. 8, FIGS. 9A-9D, FIGS. 10A-10D, FIGS. 11A-11G, and FIGS. 12A-12G are diagrams used to explain the same;

DESCRIPTION OF THE PREFERRED EMBODIMENTS

By the way, the conventional filter apparatus is used to convert a signal, which changes with a dimension of time, to a signal changing with a dimension of frequency through Fourier transform so as to filter its frequency component. Whereas, the inventors of this invention have previously proposed a filter apparatus, in which a signal changing with a dimension of time is converted to a pattern space and the pattern deformation permits the filtering processing to be conducted. Such filter apparatus as described above is employed in this invention.

Therefore, before describing the embodiments of this invention, in order to facilitate the understanding thereof, an example of such filter apparatus previously proposed will be described first with reference to the attached drawings.

First of all, a pattern space will be described. If a television signal of, for example, one frame is composed of m picture elements in the horizontal direction and n picture elements in the vertical direction, and an amplitude of each picture element is taken as f $(x_i, y_j)$ where i is greater than or equal to 1 but less than m ($1 \leq i < m$) and j is greater than or equal to 1 but less than n ($1 \leq j < n$), the above television signal can be regarded that f $(x_i, y_j)$ of k numbers ($= m \times n$) are arranged sequentially.

If this is expressed as $$F = (f_1, f_2 \ldots f_k)$$

where $$f_1 = f(x_1, y_1)$$
$$\vdots$$
$$f_k = f(x_m, y_n)$$

this television signal of one frame can be considered as a vector F of k dimensions.

A multi-dimensional space where the levels of signals at plural time points are expressed by vector representation in response to respective dimensions is called as the pattern space.

In like manner, a three-dimensional pattern space can be constructed by using levels $f_{t-1}$, $f_t$, $f_{t+1}$ ($2 \leq t < k-1$) of signals at adjacent three points.

Figure 1:
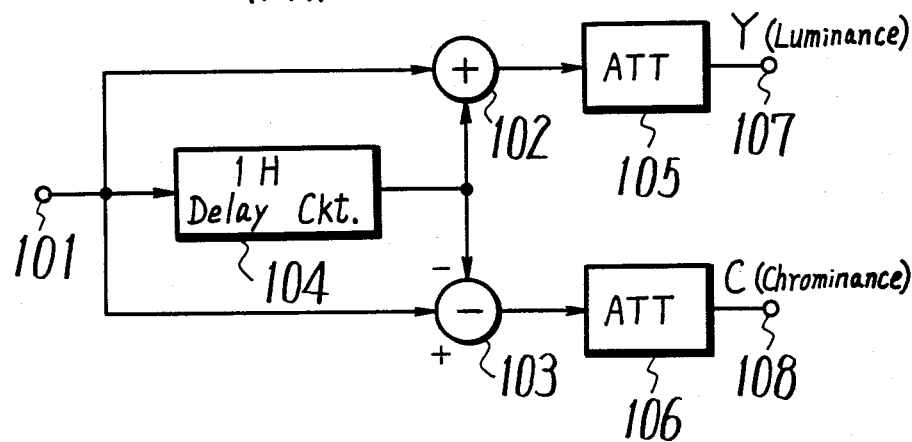
FIG. 1 is a schematic diagram showing the conventional comb filter.
Figure 3:
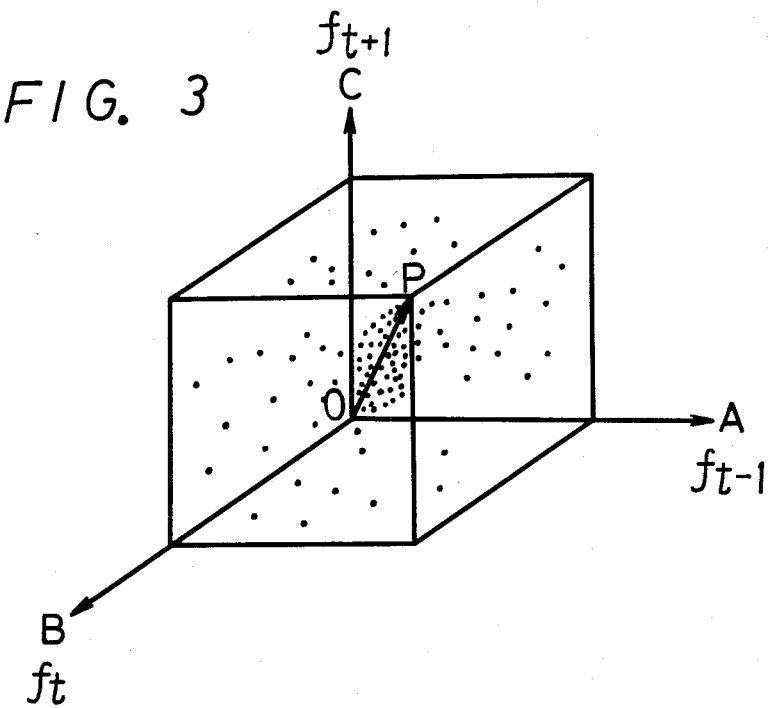
FIG. 3, FIGS. 4A, 4B, 4C, and FIG. 5 are diagrams used to explain the filter apparatus that the inventors of this invention have proposed previously.

FIG. 3 is a perspective view illustrating such three-dimensional pattern space, in which respective vectors are expressed by desired points within spaces that are encircled by the maximum levels of the signals.

In this three-dimensional pattern space, a line connecting an original point or origin O to a point P where the vector is maximum indicates that $f_{t-1} = f_t = f_{t+1}$.

Figure 4A:
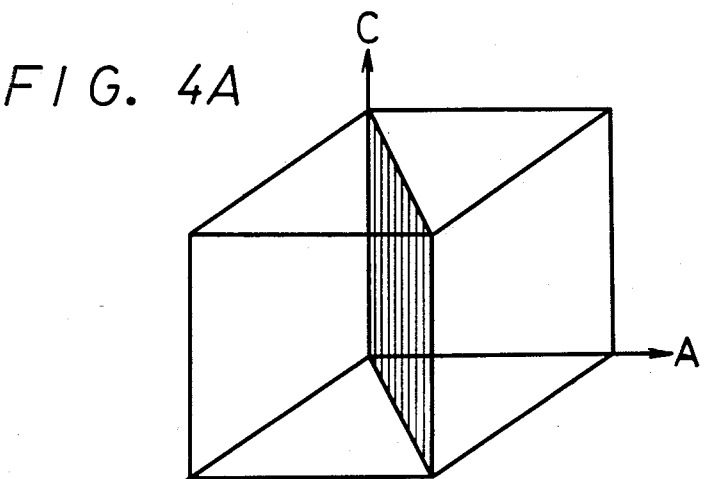

A plane shown in FIG. 4A indicates that $f_{t-1} = f_t \neq f_{t+1}$. Moreover, a plane shown in FIG. 4B indicates that $f_{t-1} \neq f_t = f_{t+1}$. These indicate that the signal changes in a step-like form.

Figure 4B:
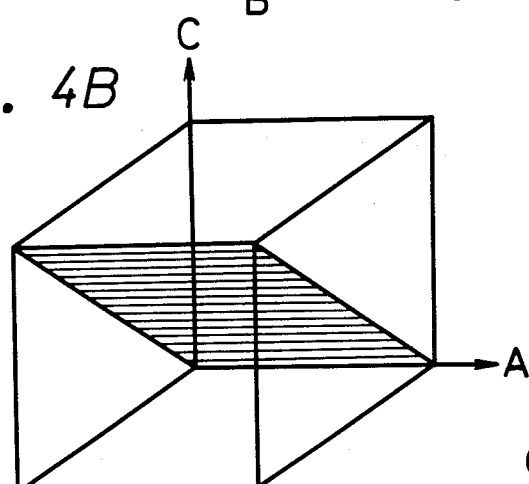
Figure 4C:
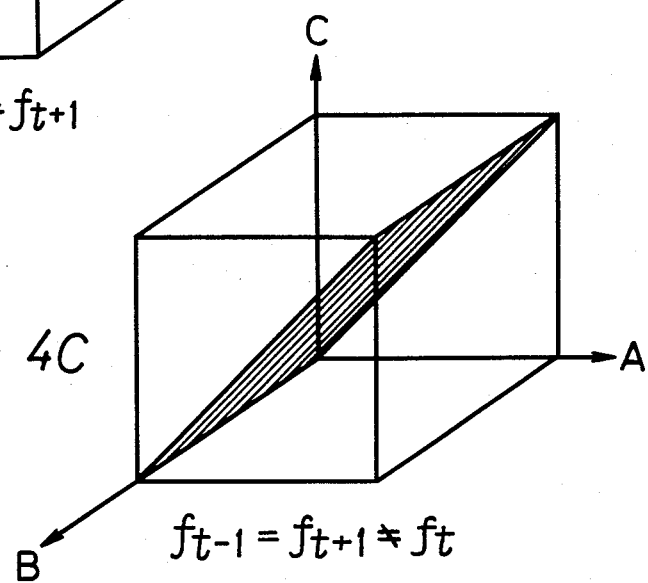

Whereas, a plane shown in FIG. 4C indicates that $f_{t-1} = f_{t+1} \neq f_t$, which implies that the signal changes abruptly.

Figure 5:
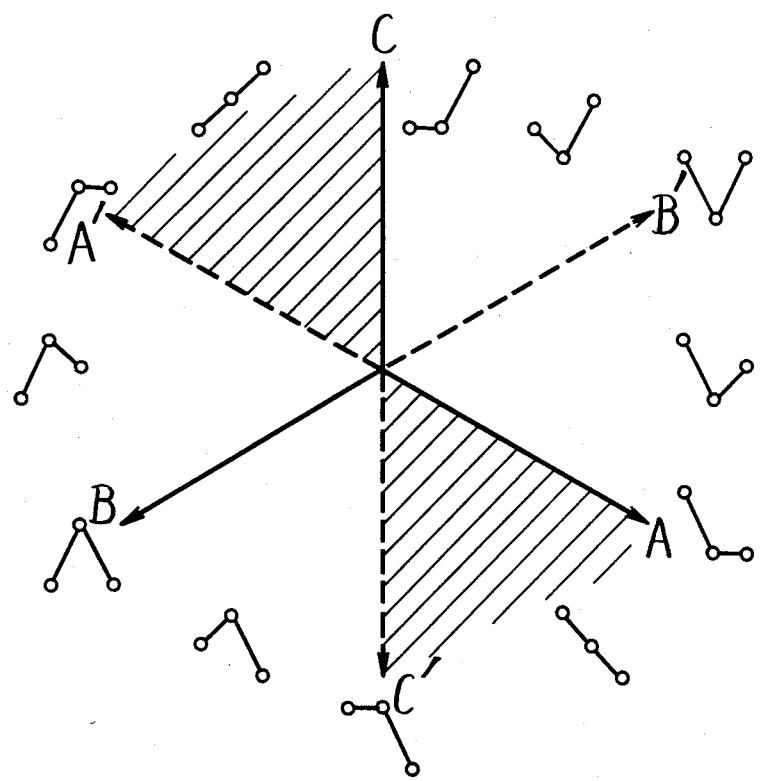

If this three-dimensional pattern space is viewed from the direction to which the line O-P is extended, this becomes as shown in FIG. 5, where the signals in the respective ranges or spaces are respectively changed in the outer periphery as shown in the figure. In FIG. 5, the line O-P in FIG. 3 is represented as an origin; the plane in FIG. 4A is represented as an axis A; the plane in FIG. 4B is represented as an axis B; and the plane in FIG. 4C is represented as an axis C, respectively.

By the way, in the case of the color video signal of NTSC system, the chrominance signal thereof is such that a chrominance subcarrier with a frequency of 3.58 MHz is modulated by a chrominance signal. Therefore, signals at three points are taken out therefrom at the interval of 140 n seconds which corresponds to $\frac{1}{2}$ of the wavelength of the chrominance subcarrier and the levels of the signals at these three points are used to constitute the pattern space as described above.

In this case, the chrominance signal component is inverted in phase at every 140 n seconds. Consequently, as shown by marks X in FIG. 6, the chrominance signal components are distributed in the vicinity of a line c-f in the pattern space.

Figure 6:
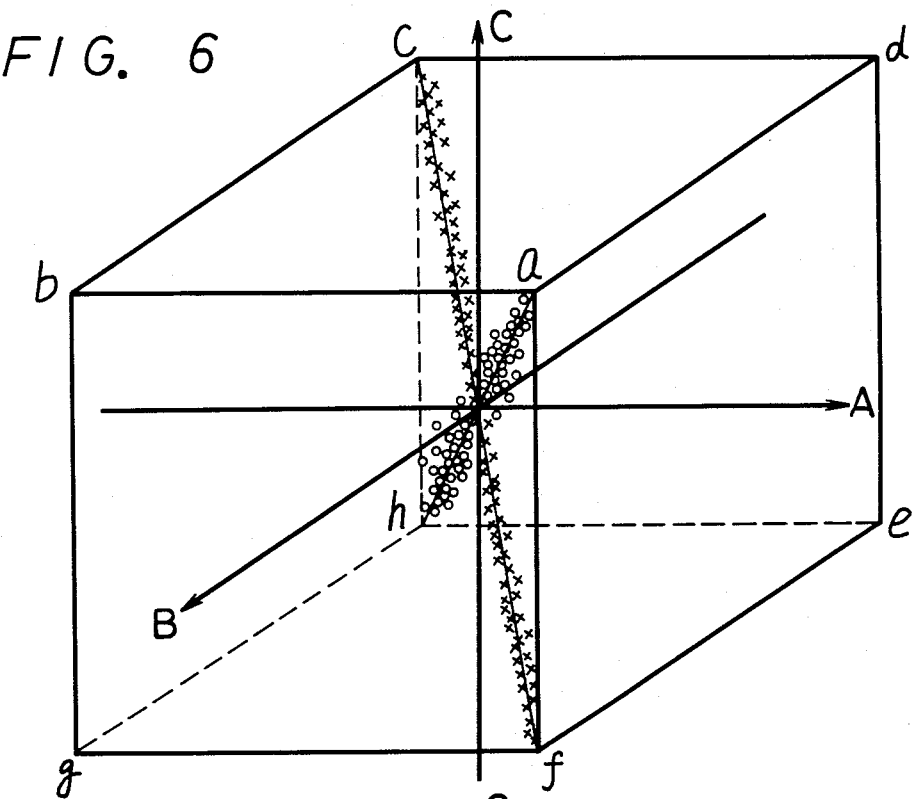
FIG. 6 is a diagram used to explain this invention.

While, the luminance signal component is hardly changed at the interval of about 140 n seconds and has quite strong correlativity, so that in the pattern space, the luminance signal components are distributed in the vicinity of a line a-h as shown by marks O in FIG. 6.

Accordingly, in this pattern space, if the spaces other than the space near the line c-f are suppressed, the chrominance signal can be extracted separately. This invention is to separate the chrominance signal in this way. With reference to the drawings, embodiments of this invention will be described hereinafter.

Figure 7:
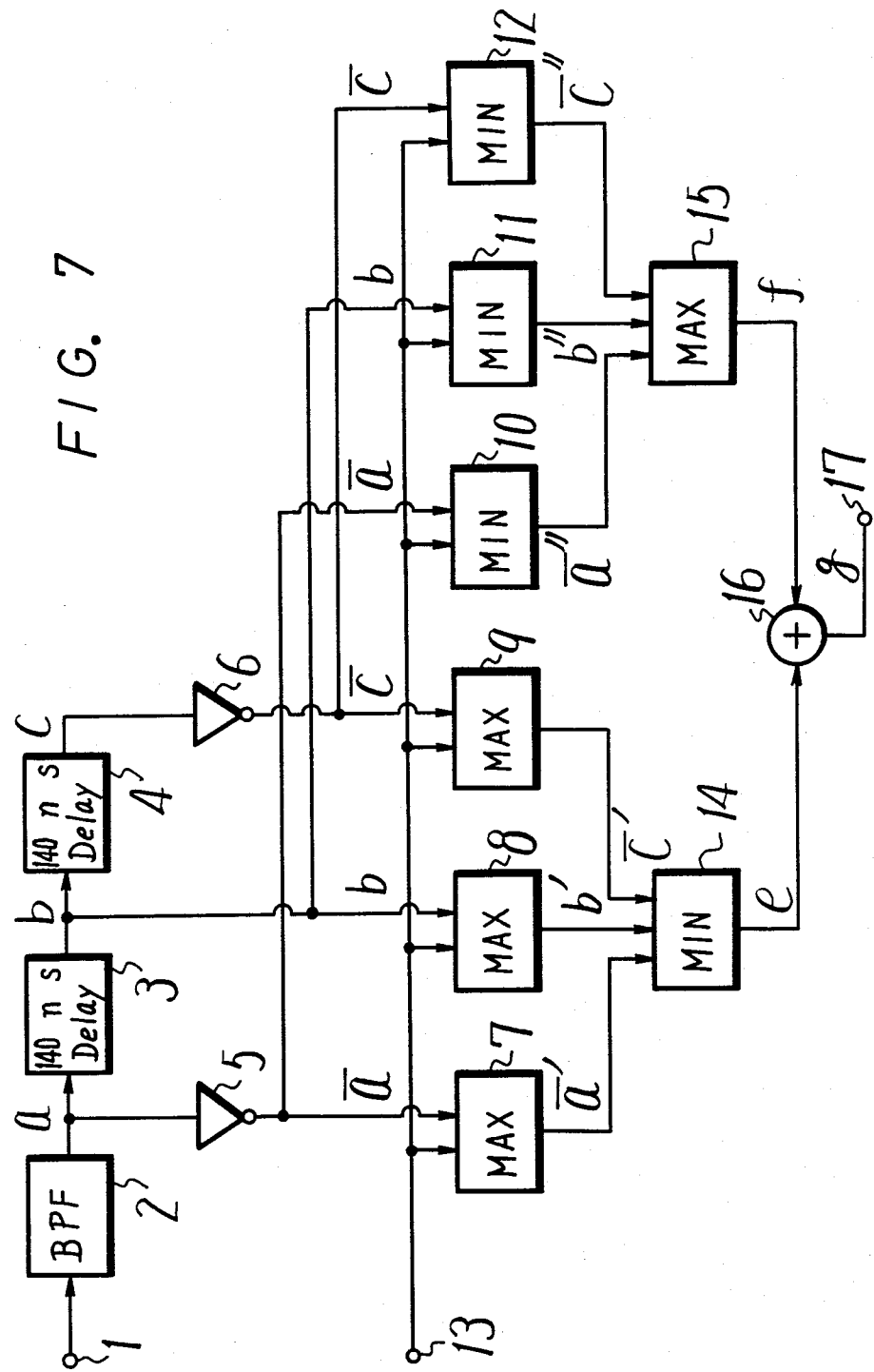
FIG. 7 is a circuit block diagram showing one embodiment of a separating filter according to this invention.
Figure 9A:
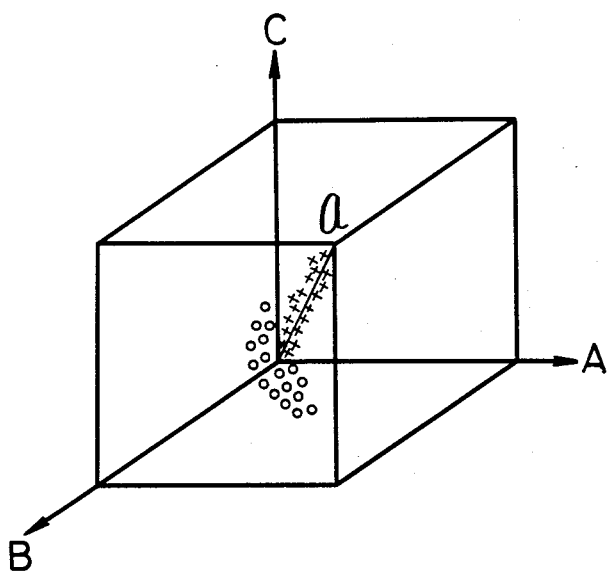
Figure 9B:
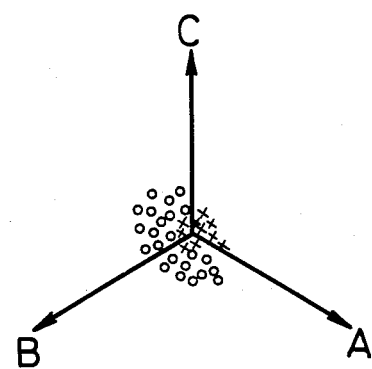
Figure 9C:
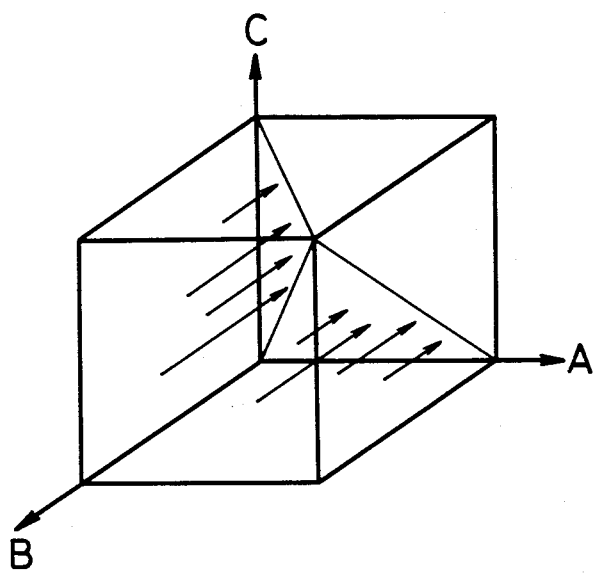
Figure 9D:
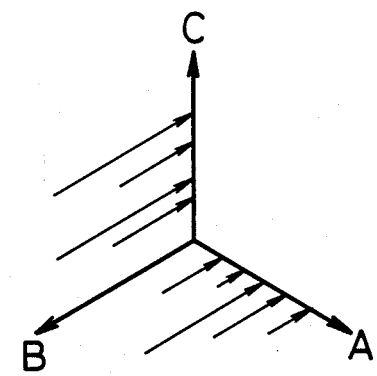
Figure 10A:
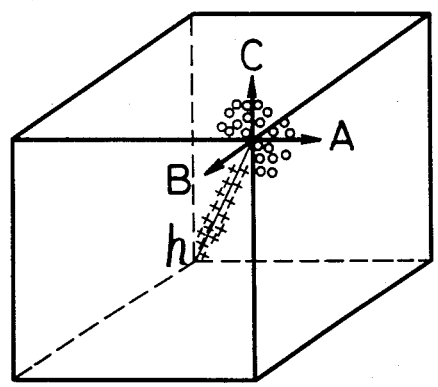
Figure 10B:
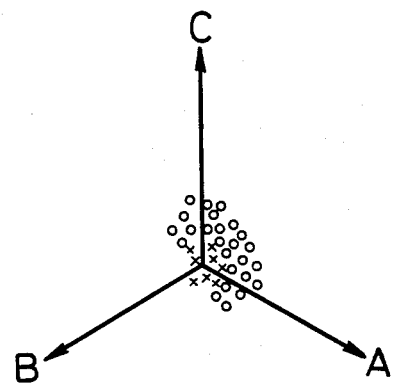
Figure 10C:
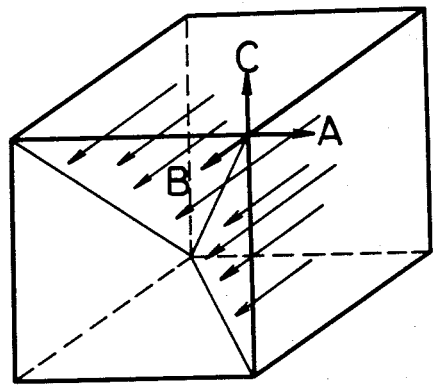
Figure 10D:
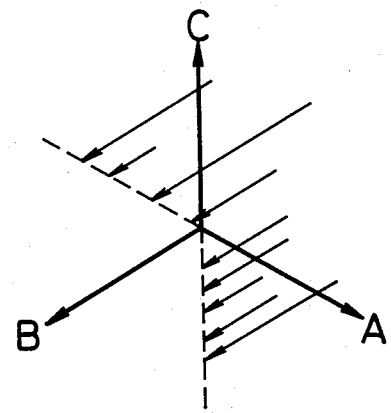

FIG. 7 is a structural view of one example of a circuit arrangement of a separating filter according to this invention. In FIG. 7, a video signal is supplied through an input terminal 1 to a band pass filter 2 which produces a signal with a frequency band of 3.58 MHz±500 kHz. This signal is supplied to a series circuit composed of delay circuits 3 and 4, each having a delay time of 140 n seconds. Moreover, the signal from the band pass filter 2 and the signal from the delay circuit 4 are respectively fed to inverters 5 and 6.

Figure 8:
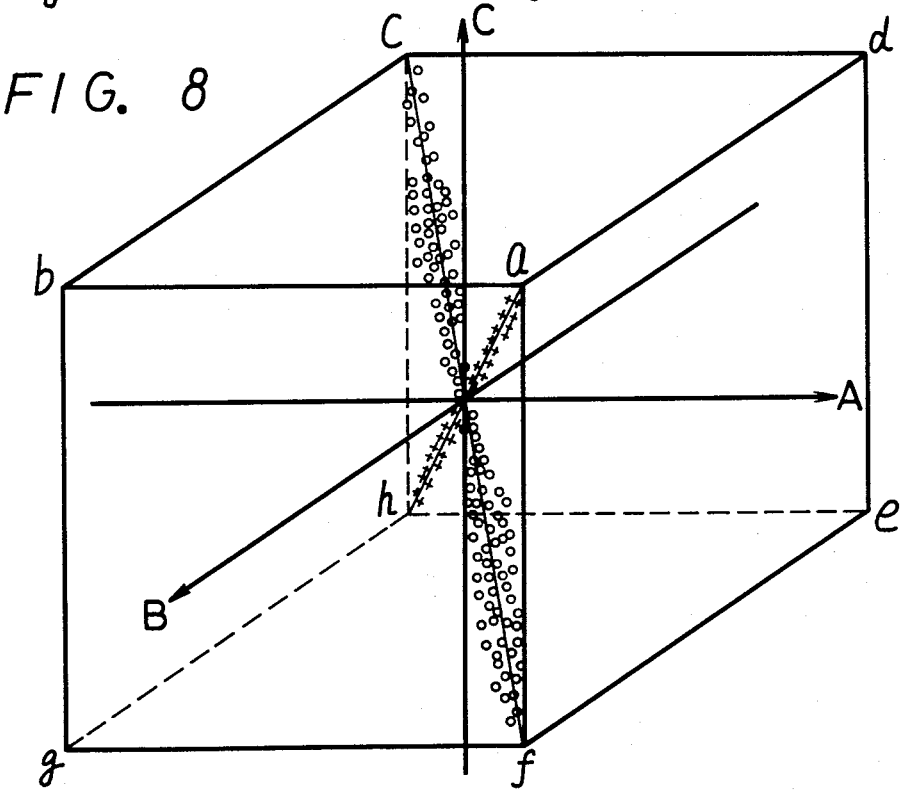

Since the inverters 5 and 6 are provided as described above, the axes A and C in the pattern space are inverted and as illustrated in FIG. 8, the chrominance signal components are distributed in the proximity of the line a-h while the luminance signal components are distributed in the proximity of the line c-f.

The signals from the inverters 5 and 6 and the delay circuit 3 are respectively supplied to logic calculation or operation circuits (hereinafter, simply called MAX) 7, 8 and 9, each of which takes out the maximum signal from signals supplied thereto, and logic operation circuits (hereinafter, simply called MIN) 10, 11 and 12, each of which takes out the minimum signal from the signals supplied thereto. To the respective logic operation circuits 7 to 12 is supplied a reference voltage of zero Volt from a terminal 13.

Accordingly, the MAX circuits 7 to 9 produce positive polarity parts of the signals supplied thereto, while the MIN circuits 10 to 12 produce negative polarity parts of the signals supplied thereto. That is, pattern spaces shown in FIGS. 9A, 9B and FIGS. 10A, 10B are constructed.

Signals from the MAX circuits 7 to 9 are all supplied to a MIN circuit 14 and signals from the MIN circuits 10 to 12 are all supplied to a MAX circuit 15.

By these logical calculations, spaces in the pattern spaces are suppressed as shown in FIGS. 9C, 9D and FIGS. 10C, 10D. In this case, the suppressed spaces contain much luminance signal components, so that the luminance signal components are suppressed and hence the chrominance signal components are produced.

The chrominance signal components of positive and negative polarities thus extracted are added together by an adding circuit 16 and then fed to a terminal 17.

Next, the operation of the embodiment of this invention in FIG. 7 will be described. First, the operation when the pure chrominance signal is supplied to the input terminal 1 will be described with reference to FIGS. 11A through 11G. In the NTSC system, since the chrominance subcarrier frequency is generally 3.58 MHz (where one wave length equals to 280 n seconds), a signal a at the input side of the delay circuit 3, a signal b at the output side thereof and a signal c at the output side of the delay circuit 4 become as shown in FIG. 11A respectively. The signals a and c of these signals a, b and c are supplied to the inverters 5 and 6. Therefore the output signals therefrom become signals $\bar{a}$, b and $\bar{c}$ respectively as shown in FIG. 11B. When these signals $\bar{a}$, b and $\bar{c}$ are supplied to the MAX circuits 7 to 9, these circuits 7 to 9 produce such signals $\bar{a}'$, b' and $\bar{c}'$ as shown in FIG. 11C, while the signals $\bar{a}$, b and $\bar{c}$ are concurrently supplied to the MIN circuits 10 to 12 so that these circuits 10 to 12 produce such signals $\bar{a}''$, b'' and $\bar{c}''$ as shown in FIG. 11D, respectively.

Moreover, the signals $\bar{a}'$, b' and $\bar{c}'$ from the MAX circuits 7 to 9 are supplied to the MIN circuit 14 which produces such a signal e as illustrated in FIG. 11E. While, the signals $\bar{a}''$, b'' and $\bar{c}''$ from the MIN circuits 10 to 12 are supplied to the MAX circuit 15 which produces a signal f as shown in FIG. 11F. These signals e and f are added with each other by the adding circuit 16 and therefore an output signal g as shown in FIG. 11G is produced at the output terminal 17.

In other words, in accordance with this circuit arrangement, the inputted chrominance signal without any deterioration is developed at the output terminal 17.

Figure 12A:
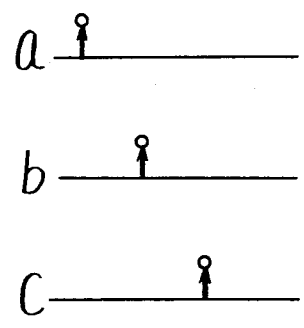
Figure 12B:
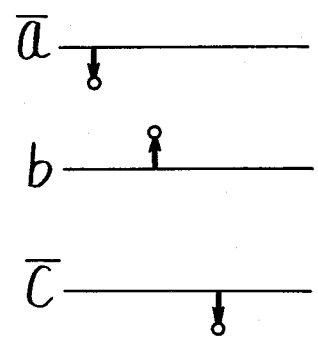
Figure 12C:
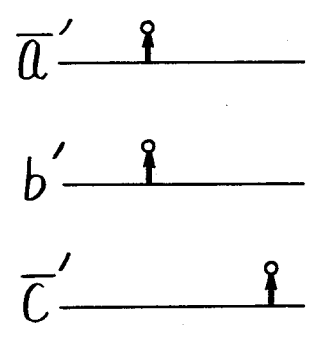
Figure 12D:
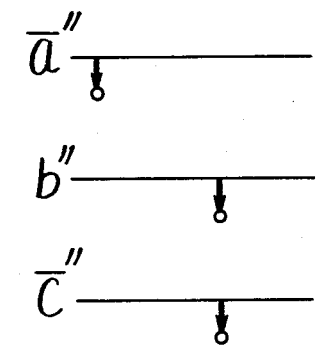
Figure 12E:
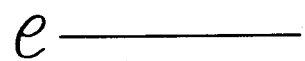
Figure 12F:

Next, the operation of this invention of FIG. 7 when the pure liminance signal is supplied to the input terminal 1 will be discussed with reference to FIGS. 12A through 12G. In this case, the signal a at the input side of the delay circuit 3, the signal b at the output side thereof and the signal c at the output side of the delay circuit 4 become such as shown in FIG. 12A, respectively. The signals $\bar{a}$, b and $\bar{c}$ to be supplied to the MAX circuits 7 to 9 and the MIN circuits 10 to 12 become such as shown in FIG. 12B, respectively. Moreover, the output signals $\bar{a}'$, b' and $\bar{c}'$ of the MAX circuits 7 to 9 become as shown in FIG. 12C, while the output signals $\bar{a}''$, b'' and $\bar{c}''$ of the MIN circuits 10 to 12 become as shown in FIG. 12D. Accordingly, the output signal e of the MIN circuit 14 becomes zero as shown in FIG. 12E and the output signal f from the MAX circuit 15 also becomes zero as shown in FIG. 12F so that the output signal g of the adding circuit 16 becomes zero as shown in FIG. 12G.

That is, in this circuitry the luminance signal component is suppressed, and it will never appear at the output terminal 17.

Figure 13A:
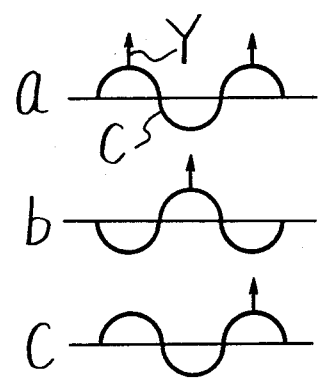
FIGS. 13A to 13G are waveform diagrams used to explain the operation of the separating filter according to this invention.
Figure 13B:
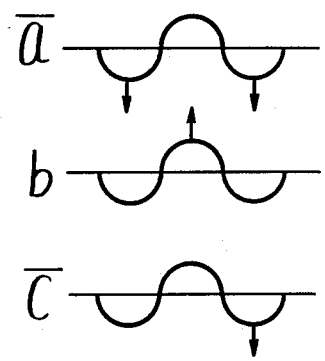

Finally, the operation of the example of this invention in FIG. 7 where the composite color video signal including the luminance signal mixed with the chrominance signal is supplied to the input terminal 1 will be described with reference to FIGS. 13A through 13G. In this case, the signal a at the input side of the delay circuit 3, the signal b at the output side thereof and the signal c at the output side of the delay circuit 4 become as shown in FIG. 13A, respectively. Therefore, the signals $\bar{a}$, b and $\bar{c}$ to be supplied to the MAX circuits 7 to 9 and the MIN circuits 10 to 12 become as shown in FIG. 13B.

Figure 13C:
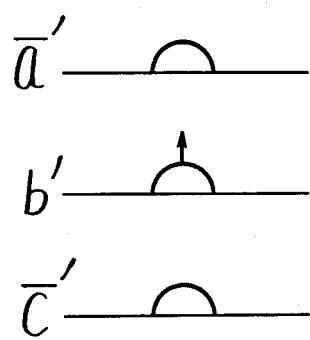
Figure 13D:
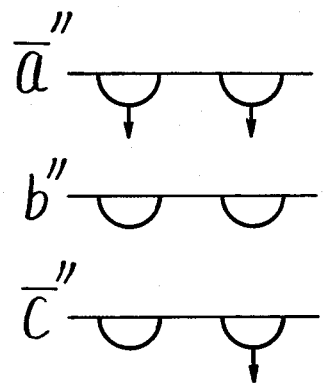
Figure 13E:
Figure 13F:
Figure 13G:

Moreover, the output signals $\bar{a}'$, b' and $\bar{c}'$ of the MAX circuits 7 to 9 become as shown in FIG. 13C, while the output signals $\bar{a}''$, b'' and $\bar{c}''$ of the MIN circuits 10 to 12 become as shown in FIG. 13D. Accordingly, the output signal e from the MIN circuit 14 becomes as shown in FIG. 13E and the output signal f from the MAX circuit 15 becomes as shown in FIG. 13F so that the output signal g of the adding circuit 16 becomes as shown in FIG. 13G and hence the pure chrominance signal the luminance signal component of which is removed is produced at the output terminal 17.

In this way the liminance signal is suppressed, and hence the chrominance signal is extracted. According to this invention, since the filtering of the signal is conducted on the basis of the deformation of the aforementioned pattern spaces, the luminance signal is removed without deteriorating the chrominance signal, thus the satisfactory chrominance signal being extracted.

Moreover, in case of the conventional comb filter, the employed delay circuit having one horizontal period (1H) delay was considerably large-sized and expensive. But, in accordance with this invention, such 1H delay circuit is not needed, so that the circuit arrangement thereof is made compact as well as inexpensive.

Figure 14:
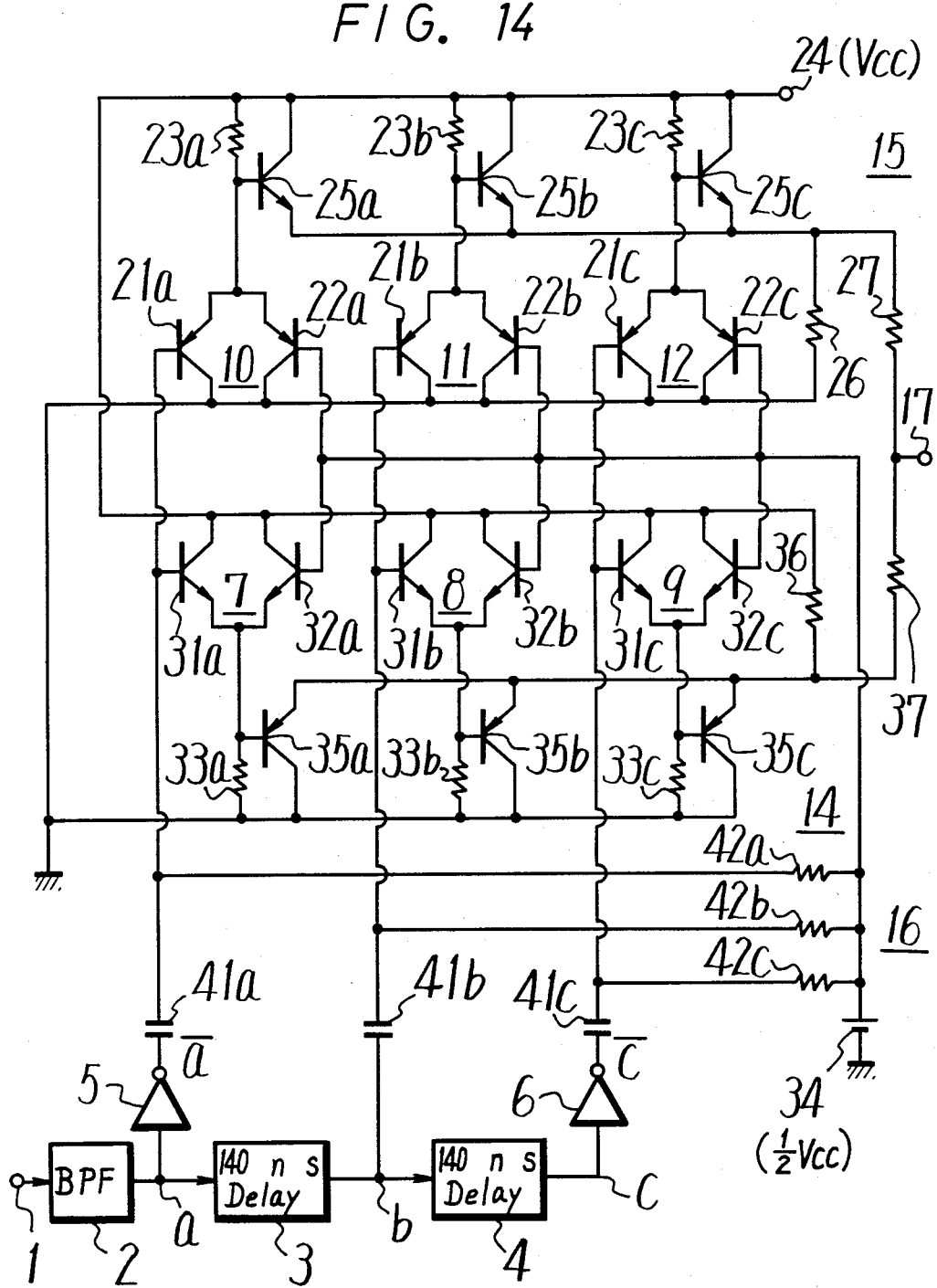
FIG. 14 is a connection diagram showing an example of a practical circuit of the same.

FIG. 14 shows a practical example of the circuit arrangement according to this invention.

In the figure, there are provided three circuits each being formed of a pair of pnp type transistors 21a, 22a; 21b, 22b; and 21c, 22c. The collectors thereof are connected together to the ground and the emitters of each pair of the transistors are connected together. The connection points therebetween are respectively connected to a power source terminal 24 of $V_{cc}$ by way of resistors 23a, 23b and 23c and also connected to bases of npn type transistors 24a, 25b and 25c. The collectors of these transistors 25a to 25c are connected to the power source terminal 24 and the emitters thereof are connected together and then grounded by way of a resistor 26 and also connected to an output terminal 17 by way of a resistor 27.

There are further provided three circuits, each of which is formed of a pair of npn type transistors 31a, 32a; 31b, 32b; and 31c, 32c. The collectors thereof are connected together to the power source terminal 24 and the emitters of each pair of the transistors are connected together to the ground respectively by way of resistors 33a, 33b and 33c and also connected to bases of pnp type transistors 35a, 35b and 35c, respectively. The collectors of these transistors 35a to 35c are grounded and the emitters thereof are connected together to the power source terminal 24 by way of a resistor 36 and also connected to the output terminal 17 by way of a resistor 37.

Moreover, the bases of the transistors 21a, 31a; 21b, 31b; and 21c, 31c are connected together to the output sides (shown by ā, b̄, and c̄) of the inverter 5, the delay circuit 3 and the inverter 6 by way of capacitors 41a, 41b and 41c and also counected to a power source terminal 34 of ½$V_{cc}$ by way of resistors 42a, 42b and 42c respectively. Furthermore, the bases of the transistors 22a, 22b, 22c, 32a, 32b and 32c are connected together to the power souce terminal 34.

In this circuit arrangement of FIG. 14, the pair of the transistors 21a, 22a; 21b, 22b; and 21c and 22c respectively correspond to the MIN circuits 10 to 12 shown in FIG. 7, while the pair of the transistors 31a, 32a; 31b, 32b; and 31c, 32c respectively correspond to the MAX circuits 7 to 9 shown in FIG. 7. Accordingly, in each of these circuits 7 through 12, the input signal is compared with the ½$V_{cc}$ whereby either of the smaller or larger one is taken out therefrom. Further, the transistors 25a to 25c correspond to the MAX circuit 15, and the transistors 35a to 35c correspond to the MIN circuit 14. In addition, the resistors 26, 27, 36 and 37 correspond to the adding circuit 16. In this adding circuit 16, the signals of more than the ½$V_{cc}$ and less than ½$V_{cc}$ are added and then delivered to the output terminal 17.

Figure 15:
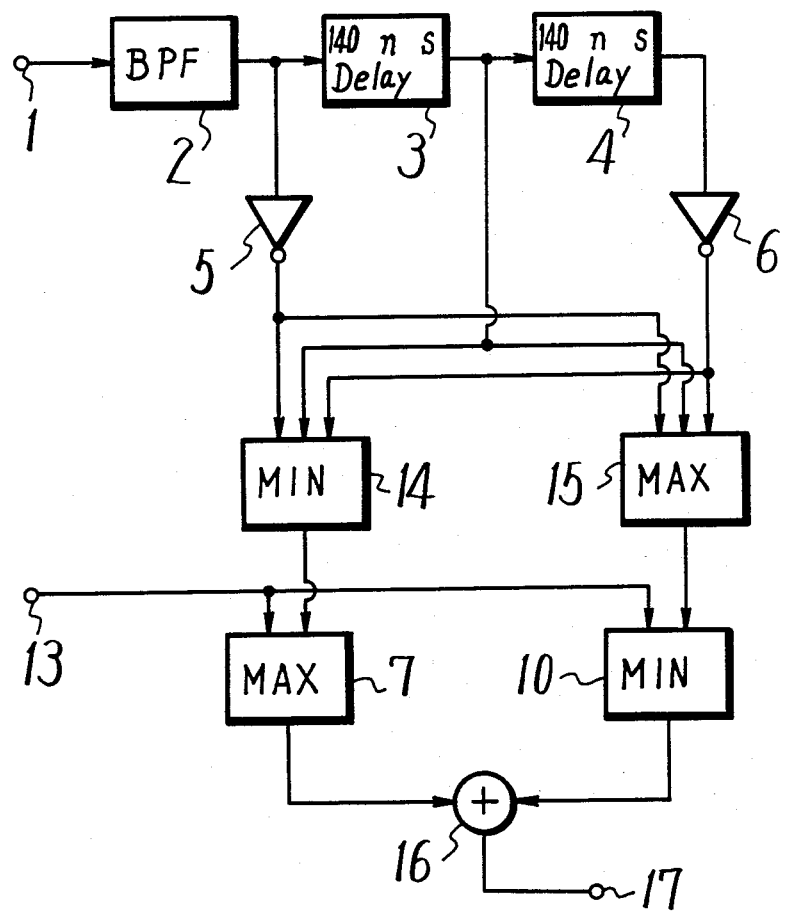
FIG. 15 is a circuit block diagram schematically showing other embodiment of this invention.

FIG. 15 shows other embodiment of this invention, in which like references corresponding to those of FIGS. 7 and 14 identify the same elements and parts and will not be described in detail. In the example of this figure, the signals from the inverter 5, the delay circuit 3 and the inverter 6 are supplied to the MIN circuit 14 and the MAX circuit 15 and the output signals thereof are compared with the reference voltage from the terminal 13 in the MAX circuit 7 and the MIN circuit 10. The output signals therefrom are added together by the adding circuit 16.

Speaking logically, it is obvious that this circuit arrangement of FIG. 15 can bring the same result as that of the circuit arrangement in FIG. 7.

Figure 16:
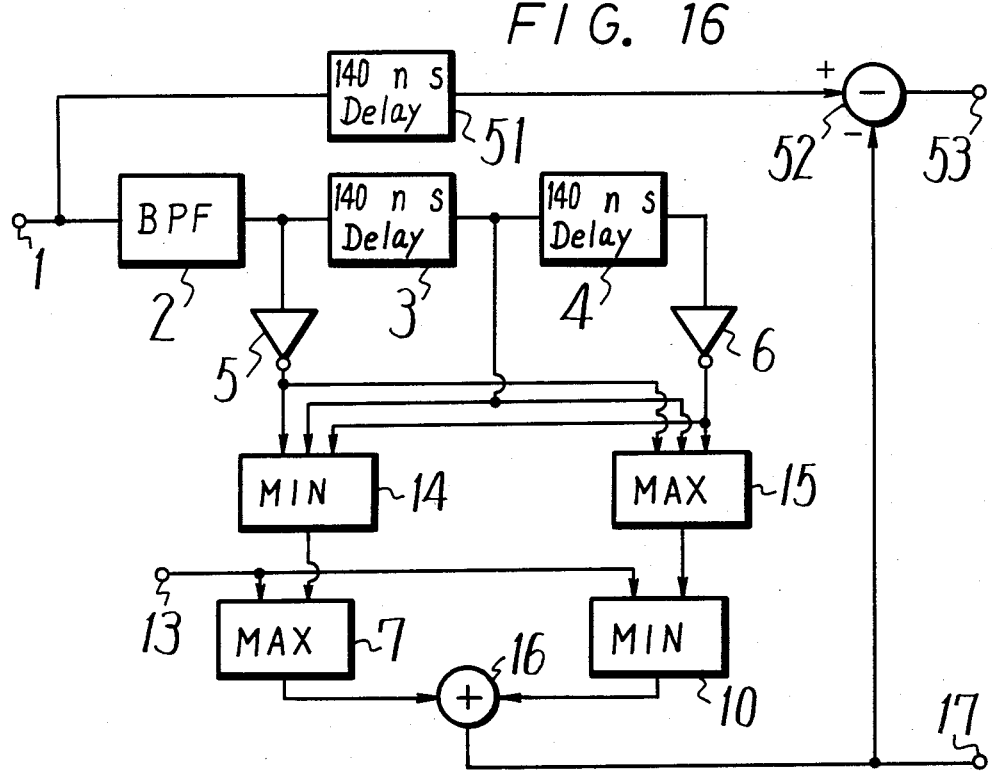
FIG. 16 is a circuit block diagram showing an example of a circuit for extracting a chrominance signal and a luminance signal from a composite video signal according to this invention.

Moreover, FIG. 16 schematically illustrates an example of the circuit according to this invention for extracting the chrominance signal together with the luminance signal. In the example of this figure, the signal fed to the input terminal 1 is supplied through a delay circuit 51 having a delay time of 140 n seconds to a subtracting circuit 52, and the chrominance signal generated at the output terminal 17 is supplied to the subtracting circuit 52. In this subtracting circuit 52, the chrominance signal is subtracted from the signal fed from the delay circuit 51, whereby the luminance signal is extracted therefrom and delivered to an output terminal 53.

According to this circuitry of FIG. 16, since the chrominance signal which has no signal deterioration, is subtracted from the composite video signal, it is possible to extract the luminance signal having no so-called dot interference or the like which is caused by the residual chrominance signal.

Figure 17:
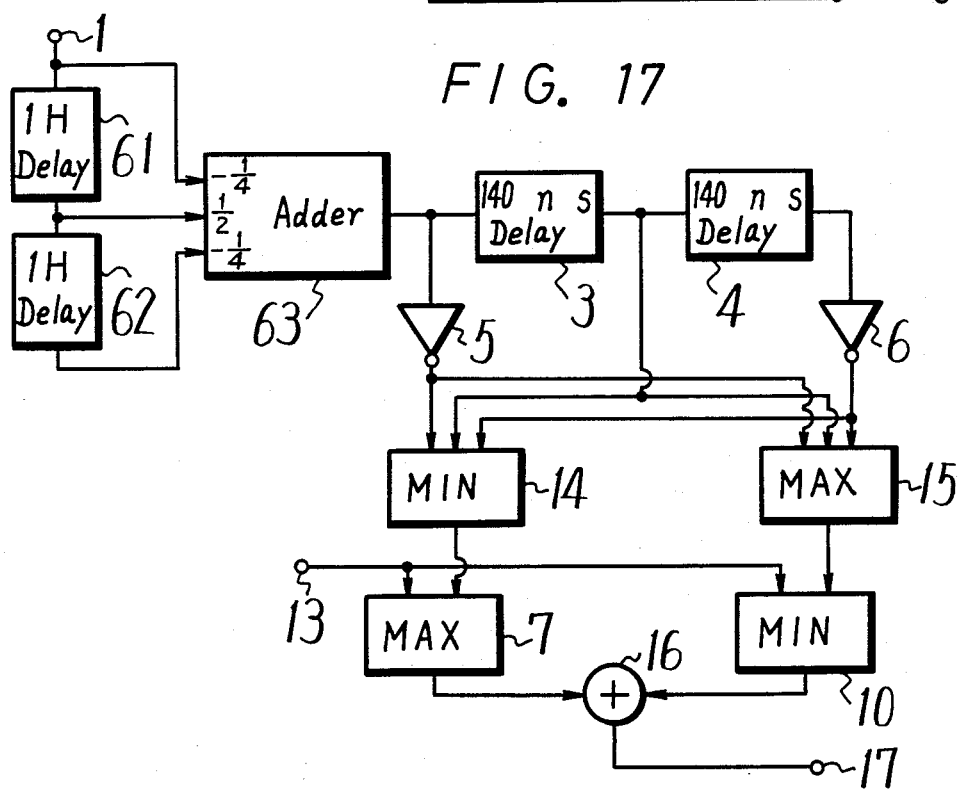
FIG. 17 is a circuit block diagram showing a further example of this invention to which a comb filter is additionally connected.

FIG. 17 shows a further example of the invention for extracting the chrominance signal together with the luminance signal to which a comb filter is additionally connected. That is, in the example of this figure, the signal from the input terminal 1 is supplied to delay circuits 61 and 62, each having a 1H delay, and signals at the input side of the delay circuit 61 and the output sides of the delay circuits 61 and 62 are supplied to an adding circuit 63, under gains of −¼, ½ and −¼, respectively, thus composing a chrominance signal extracting comb filter. If the signal from this comb filter is further supplied to the separating filter of this invention, it is possible to extract the chrominance signal quite satisfactorily.

Further, the separating circuit of this invention can be constructed by the use of a delay circuit which has a delay time of 280 n seconds. In such case, since the chrominance signal can recover the original phase, the inverters 5 and 6 are not required.

Moreover, in accordance with his invention, filtering is conducted by using from one to more than three delay circuits to distribute signal components in pattern spaces of two dimensions to up to more than four dimensions.

Figure 18:
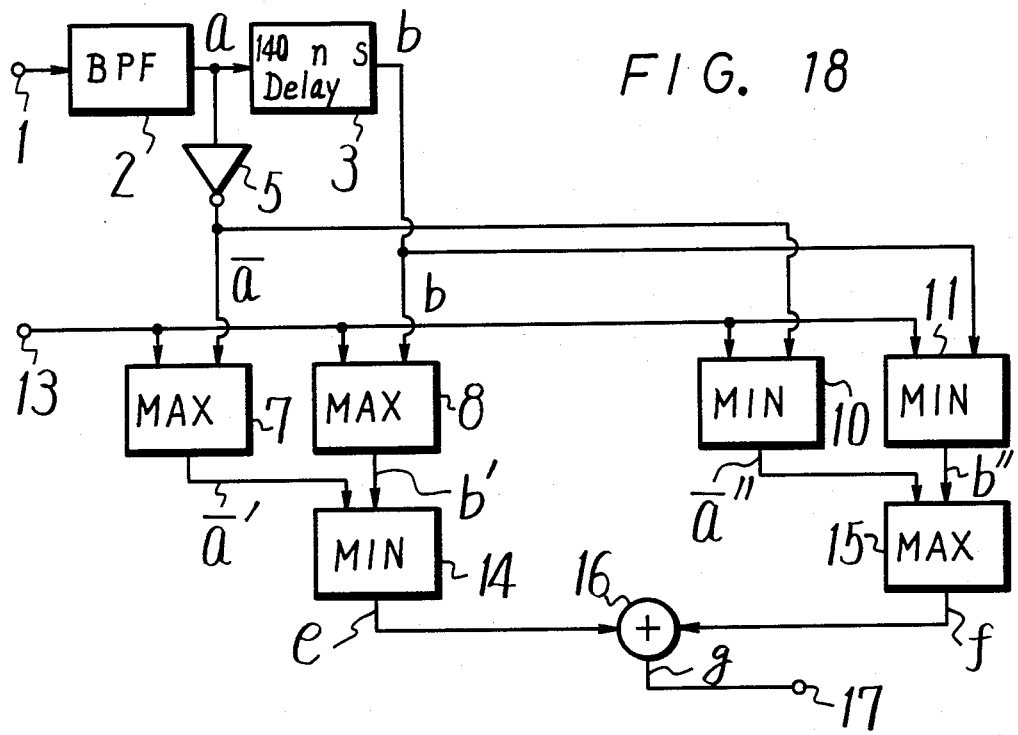
FIG. 18 is a circuit block diagram showing another embodiment of this invention, in which one delay circuit is used.

FIG. 18 shows such an example of this invention, in which one delay circuit is used. Since the circuit arrangement of FIG. 18 is same as that of FIG. 7 except for the delay circuit 4 and the inverter 6 and most of the circuit elements are made common to the circuit elements shown in FIG. 7, the detailed explanation thereof will not be made. According to the circuit of FIG. 18, the pure chrominance signal can be obtained too.

The operation of this circuit in FIG. 18 where the composite color video signal in which the luminance signal and the chrominance signal are mixed with each other is supplied to the input terminal 1 will be described with reference to FIGS. 19A through 19G.

Figure 19A:
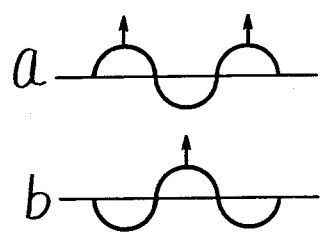
FIGS. 19A through 19G are waveform diagrams used to explain the operation of the circuit in FIG. 18.
Figure 19B:
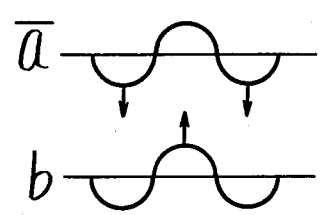

In this case, the signal a at the input side of the delay circuit 3 and the signal b at the output side thereof become as shown in FIG. 19A. Accordingly, the signal e,ovs/a/ to be supplied to the MAX circuit 7 and the MIN circuit 10 and the signal b to be supplied to the MAX circuit 8 and the MIN circuit 11 become as shown in FIG. 19B.

Figure 19C:
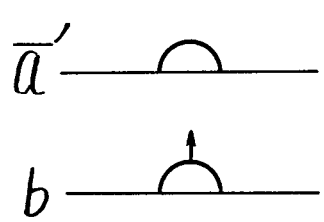
Figure 19D:
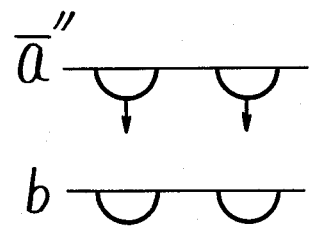

Also, the output signals ā' and b' of the MAX circuits 7 and 8 become as shown in FIG. 19C, while the output signals ā" and b" of the MIN circuits 10 and 11 become as shown in FIG. 19D.

Figure 19E:
Figure 19F:
Figure 19G:

Therefore, the output signal e from the MIN circuit 14 becomes as shown in FIG. 19E, and the output signal f from the MAX circuit 15 becomes as shown in FIG. 19F. Thus the output g of the adding circuit 16 becomes as shown in FIG. 19G so that the pure chrominance signal from which the luminance signal component is removed is produced at the output terminal 17.

Figure 20:
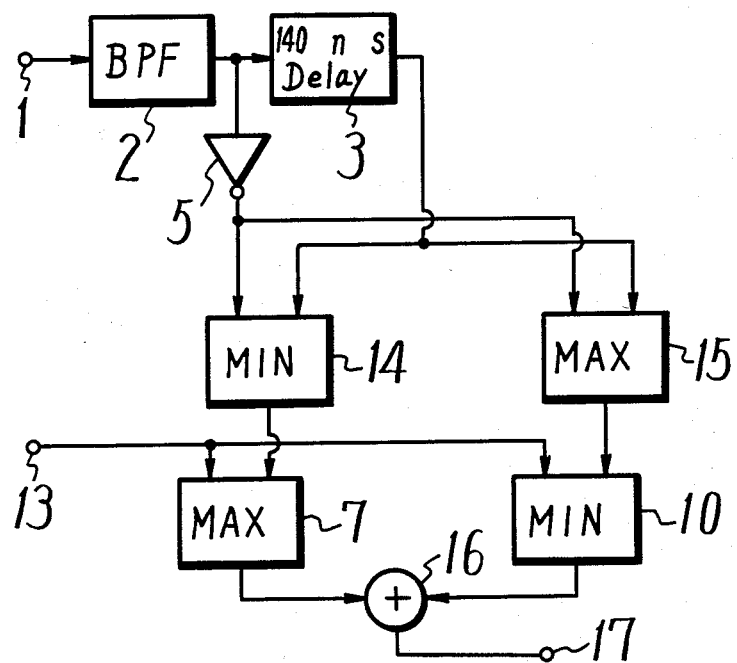
FIG. 20 is a circuit block diagram schematically showing a further embodiment of this invention.

FIG. 20 schematically shows a still further embodiment of this invention. Since the circuit arrangement of FIG. 20 is same as that of FIG. 15 except for the delay circuit 4 and the inverter 6, and most of the circuit elements thereof are common to those of FIG. 15, this circuit will not be described in detail. But, it is apparent that the circuit of FIG. 20 can achieve the same effect as that of FIG. 18.

Further, this invention can also be applied to a case where the signal is processed in either analog or digital form.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:
1. A separating filter comprising:
 (a) a band pass filter supplied with a composite color video signal, having a resonance frequency of a chrominance sub-carrier frequency and producing an output;

(b) first means supplied with the output of said band pass filter for generating first and second signals having the same phase but having a different time relationship; and (c) second means for comparing levels of said first and second signals with a level of a reference signal and for selecting the one of said first and second signals having a level nearer the reference signal level.

2. A separating filter according to claim 1, wherein said first means comprises;

(a) a delay circuit having an input supplied with the output of said bandpass filter for imparting a time delay of $1/f_{sc} \times \frac{1}{2} \times (2N+1)$ ($f_{sc}$: chrominance sub-carrier frequency, N: an integer including zero); and (b) an inverter connected to an input of said delay circuit, said first signal being obtained from the input of said delay circuit through said inverter, and said second signal being obtained from the output of said delay circuit directly.

3. A separating filter according to claim 1, wherein said first means comprises;

(a) a delay circuit having an input supplied with the output of said bandpass filter for imparting a time delay at an output of $1/f_{sc} \times (N+1)$, said first signal being obtained from the input of said delay circuit and said second signal being obtained from the output of said delay circuit.

4. A separating filter according to claim 1, wherein said second means comprises;

(a) at least first and second MAX circuits and at least first and second MIN circuits each having respective first and second input terminals, said first terminals of said first and second MAX circuits and of said first and second MIN circuits being supplied with the reference signal, said second input terminal of said first MAX circuit and said second input terminal of said first MIN circuit being supplied with said first signal from said first means, said second input terminal of said second MAX circuit and said second input terminal of said second MIN circuit being supplied with said second signal from said first means;

(b) a third MIN circuit supplied with the outputs of said first and second MAX circuits;

(c) a third MAX circuit supplied with the outputs of said first and second MIN circuits; and (d) adding means for adding the output of said third MIN circuit and the output of said third MAX circuit, and producing therefrom a pure chrominance signal.

5. A separating filter according to claim 1, wherein said second means comprises:

(a) first MIN circuit and first MAX circuit each having at least first and second input terminals, said first and second input terminals of said first MIN and first MAX circuits being supplied with said first and second signals from said first means, respectively;

(b) second MAX circuit and second MIN circuit each having first input terminals supplied with said reference signal, and second input terminals each supplied with the output of said first MIN circuit and the output of said first MAX circuit; and (c) adding means for adding the output of said second MAX circuit and the output of said second MIN circuit, and producing therefrom a pure chrominance signal.

6. A separating filter according to claim 1, wherein said first means comprises;

(a) a delay circuit having an input supplied with the output of said bandpass filter for imparting a time delay at an output of $1/f_{sc} \times \frac{1}{2} \times (2N+1)$, where $f_{sc}$ is the chrominance sub-carrier frequency and N is an integer including 0; and (b) an inverter connected to an output of said delay circuit, said first signal being obtained directly from the input of said delay circuit and said second circuit being obtained at the output of said inverter.

7. A separating filter according to claim 5, further comprising a delay circuit receiving said composite color video signal and for imparting a predetermined time delay thereto and a subtraction circuit connected to receive said time delayed composite color video signal at a positive input and connected to receive said pure chrominance signal at a subtractive input for producing therefrom the luminance signal contained within said composite color video signal.

8. A filter for separating a selected signal from a composite color video signal, comprising:

means connected to said composite color video signal for extracting therefrom a signal having the chrominance sub-carrier frequency;

signal distribution means receiving said signal having the chrominance sub-carrier frequency and producing therefrom a plurality of output signals having a mutual time delay corresponding to ½ wavelength of said chrominance sub-carrier signal, and in which selected ones of said output signals are in inverse phase relationship with the remaining ones of said plurality of output signals;

logic operation means connected to receive said output signals from said signal distribution means for performing logical operations thereon to suppress luminance signal components contained in said plurality of output signals from said signal distribution means and to produce a first output signal different than said plurality of output signals produced by said signal distribution means and representing the positive polarity luminance signal components and a second output signal different than said plurality of output signals produced by said signal distribution means and representing negative polarity luminance signal components; and adding means receiving said first and second output signals from said logic operation means for adding said signals together to form a chrominance signal.

9. A filter for separating a selected signal from a composite color video signal according to claim 8, in which said means for extracting said signal having the chrominance sub-carrier frequency comprises a bandpass filter having a resonant frequency substantially equal to the chrominance sub-carrier frequency.

10. A filter for separating a selected signal from a composite color video signal according to claim 8, in which said means for extracting said signal having the chrominance sub-carrier frequency comprises a comb filter including at least one time delay circuit providing a time delay equal to one horizontal scan of a video display.

11. A filter for separating a selected signal from a composite color video signal according to claim 8, in which said signal distribution means includes at least one time delay circuit having an input and for imparting at an output a time delay that is at least an odd multiple of the half-wave period of said chrominance sub-carrier frequency.

12. A filter for separating a selected signal from a composite color video signal according to claim 11, further comprising inverter means connected to the output of said time delay circuit, and in which said signal distribution means produces a first signal from the input of said time delay circuit and a second signal from the output of said time delay circuit.

13. A filter for separating a selected signal from a composite color video signal according to claim 11, further comprising inverter means connected to an output of said delay circuit, and in which said signal distribution means produces a first output signal from the output of said inverter and a second output signal from the output of said delay circuit.

14. A filter for separating a selected signal from a composite color video signal according to claim 8, in which said plurality of output signals produced by said signal distribution means includes first and second output signals different than said first and second output signals produced by said logic operation means and having the same phase relationship but having a different time relationship, and in which said logic operation means comprises at least first and second maximum circuits and at least first and second minimum circuits, each of said maximum and minimum circuits having respective first and second inputs, said first inputs of said first and second maximum circuits and of said first and second minimum circuits being supplied with a reference signal having a substantially constant predetermined level, said second input of said first maximum circuit and said second input of said first minimum circuit being supplied with said first output signal from said signal distribution means, said second input of said second maximum circuit and said second input of said second minimum circuit being supplied with said second output signal from said signal distribution means, said logic operation means further comprising a third minimum circuit supplied with outputs of said first and second maximum circuits for producing said negative polarity luminance signal fed to said adding means; and a third maximum circuit supplied with outputs of said first and second minimum circuits for producing said positive polarity luminance signal fed to said adding means.

15. A filter for separating a selected signal from a composite color video signal according to claim 8, in which said signal distribution means produces first and second signals having the same phase but having a different mutual time relationship; and in which said logic operation means comprises a first minimum circuit and a first maximum circuit each having at least first and second inputs, said first and second inputs of said first minimum and first maximum circuits being supplied with said first and second signals from said signal distribution means, respectively, said logic operation means further comprising a second maximum circuit and a second minimum circuit each having first and second inputs, said first inputs supplied with a reference signal having a substantially constant predetermined level, and said second inputs supplied with the output of said first minimum circuit and the output of said first maximum circuit, thereby producing said positive polarity luminance signal and said negative polarity luminance signal fed to said adding means.

* * * * *